United States Patent
Baviskar et al.

(10) Patent No.: US 12,045,215 B2
(45) Date of Patent: Jul. 23, 2024

(54) MACHINE LEARNING BASED DUPLICATE INVOICE DETECTION

(71) Applicant: Oracle International Corporation, Redwood Shores, CA (US)

(72) Inventors: Akash Baviskar, Maharashtra (IN); Krishnan Ramanathan, Varthur Hobli (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/971,832

(22) Filed: Oct. 24, 2022

(65) Prior Publication Data

US 2024/0134834 A1    Apr. 25, 2024

(51) Int. Cl.
 *G06F 16/215* (2019.01)
 *G06F 3/06* (2006.01)
 *G06N 20/20* (2019.01)
(52) U.S. Cl.
 CPC .......... *G06F 16/215* (2019.01); *G06F 3/0641* (2013.01); *G06N 20/20* (2019.01)
(58) Field of Classification Search
 CPC .. G06F 16/215; G06F 16/2365; G06F 3/0604; G06F 3/0641; G06N 20/00; G06N 20/20
 See application file for complete search history.

(56) References Cited

U.S. PATENT DOCUMENTS

| | | | | |
|---|---|---|---|---|
| 11,341,547 | B1 * | 5/2022 | Lau | G06F 16/215 |
| 2022/0207006 | A1 * | 6/2022 | Daruna | G06F 3/0481 |
| 2023/0259991 | A1 * | 8/2023 | Sethuraman | G06F 16/906 |
| | | | | 705/347 |
| 2023/0297956 | A1 * | 9/2023 | Kumari | G06V 30/412 |
| | | | | 705/29 |
| 2024/0135462 | A1 * | 4/2024 | Sariga | G06F 16/215 |

OTHER PUBLICATIONS

Marcel Koolwijk, "Reduced Duplicate Invoices in Accounts Payable with Machine Learing", Accounts Payable Celonis Machine, Dec. 29, 2021, https://www.processminery.com/reduced-duplicate-invoices-in-accounts-payable-with-machine-learning/.

Unknown, "Fiscal: A Machine Learning Approach", https://indico.cern.ch/event/802992/contributions/3338382/attachments/1804873/2945029/PJVerschuuren_INSIGHTS_010319.pdf, last downloaded on Oct. 21, 2022.

(Continued)

*Primary Examiner* — Marcin R Filipczyk

(74) *Attorney, Agent, or Firm* — Potomac Law Group, PLLC

(57) ABSTRACT

Embodiments detect duplicate invoices, each invoice including a plurality of fields. Embodiments generate synthetic training data using a plurality of training invoices and generating one or more modified fields for each of the plurality of training invoices. Embodiments train a machine learning model using the synthetic training data and generate a plurality of candidate invoice pairs. Embodiments input the plurality of candidate invoice pairs to the trained machine learning model and generate, by the trained machine learning model, a prediction of whether each of the candidate invoices pairs is a duplicate invoice pair.

20 Claims, 6 Drawing Sheets

(56) References Cited

OTHER PUBLICATIONS

Unknown, "Prevent duplicate spend", https://www.appzen.com/use-cases/prevent-duplicate-spend/, last downloaded on Oct. 21, 2022.
Verschuuren et al., "Supervised machine learning techniques for data matching based on similarity metrics", Sep. 15, 2021, https://arxiv.org/pdf/2007.04001.pdf.
Watts, "Using AI to build world-leading duplicate invoice prevention software", Nov. 20, 2020, https://xelix.com/ai-for-world-leading-duplicate-invoice-prevention-software/.

* cited by examiner

| Index | Invoice Number | supplier | Invoice description | Invoice date | Amount |
|---|---|---|---|---|---|
| 1 | A123 | A | Project A - B | 1-3-2021 | € 40,00 |
| 2 | B5874 | B | Cake A | 1-3-2021 | € 600,00 |
| 3 | A123a | A | Project A | 4-1-2021 | € 40,00 |
| 4 | AXY4531 | C | Advisory feb | 5-1-2021 | € 860,00 |
| 5 | SE23546 | D | Personnel costs | 5-1-2021 | € 15,00 |
| 6 | 4531 | C | feb | 7-1-2021 | € 430,00 |

301 — Index
302 — Invoice Number
303 — supplier
304 — Invoice description
305 — Invoice date
306 — Amount Possibly duplicates

Fig. 3

| INVOICE_ID1 | INVOICE_SCHEDULE_NUMBER1 | INVOICE_ID2 | INVOICE_SCHEDULE_NUMBER2 | SOURCE_RECORD_ID | DUPLICATE_PROBABILITY | RISK |
|---|---|---|---|---|---|---|
| 123457 | 1 | 123456 | 1 | 123457~1~123456~1 | 0.934122 | 891.012024 |
| 189642 | 1 | 189640 | 1 | 189642~1~189640~1 | 0.462222 | 1594.664551 |
| 189643 | 1 | 189641 | 1 | 189643~1~189641~1 | 0.462222 | 1594.664551 |
| 156437 | 1 | 156436 | 1 | 156437~1~156436~1 | 0.934122 | 114.098907 |
| 189643 | 1 | 189642 | 1 | 189643~1~189642~1 | 0.934122 | 3222.721680 |

Fig. 6

MACHINE LEARNING BASED DUPLICATE INVOICE DETECTION

FIELD

One embodiment is directed generally to a computer system, and in particular to duplicate invoice detection using a computer system.

BACKGROUND INFORMATION

Duplicate invoices are received when multiple unneeded invoices with slightly different values (invoice numbers, dates, and sometimes amounts) are produced for the same goods or services. Generally, accounts payable teams have difficulty handling the duplicate invoices. There are several reasons accounts payable teams end up receiving duplicate invoices, including optical character recognition ("OCR") errors, the same invoice sent multiple time due to late payments, typing errors while entering invoices into a database, and the propensity for vendors to send invoices using multiple channels such as emails, online portals, hardcopies, etc. Organizations can suffer huge financial losses due to paying same invoice multiple times. In addition, the costs and efforts required to manually find duplicate invoices can be very high.

SUMMARY

Embodiments detect duplicate invoices, each invoice including a plurality of fields. Embodiments generate synthetic training data using a plurality of training invoices and generating one or more modified fields for each of the plurality of training invoices. Embodiments train a machine learning model using the synthetic training data and generate a plurality of candidate invoice pairs. Embodiments input the plurality of candidate invoice pairs to the trained machine learning model and generate, by the trained machine learning model, a prediction of whether each of the candidate invoices pairs is a duplicate invoice pair.

BRIEF DESCRIPTION OF THE DRAWINGS

Further embodiments, details, advantages, and modifications will become apparent from the following detailed description of the embodiments, which is to be taken in conjunction with the accompanying drawings.

FIG. 3 illustrates an example of invoices that may be identified as possible duplicates.

FIG. 6 is an example output showing, for each pair of invoices, the duplicate probability as well as a risk in accordance to embodiments.

DETAILED DESCRIPTION

One embodiment is a machine learning system that is trained using synthetic data. Candidate pairs of potential duplicate invoices are generated, and the trained machine learning system is used to predict the likelihood that each pair is a duplicate.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
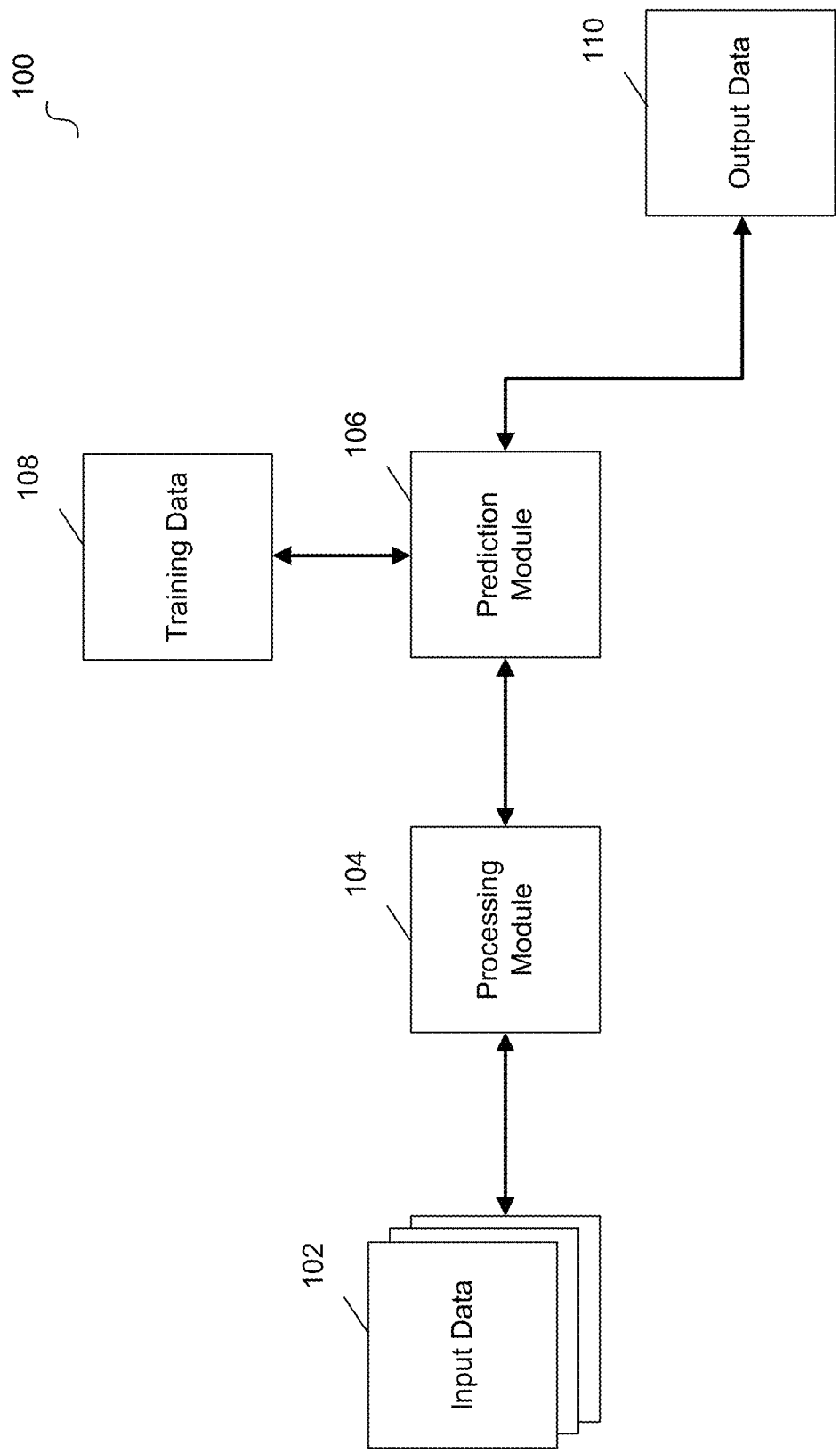
FIG. 1 illustrates a system for detecting duplicate invoices using machine learning or artificial intelligence according to an example embodiment.

FIG. 1 illustrates a system for detecting duplicate invoices using machine learning ("ML") or artificial intelligence ("AI") according to an example embodiment. System 100 includes input data 102, a processing model 104, a prediction module 106, training data 108, and output data 110. In some embodiments, input data 102 can include several elements or rows of data, and the data can be processed by processing module 104. For example, processing module 104 can generate metadata profiles based on input data 102. In some embodiments, the metadata profiles, not the input data itself, is fed to prediction module 106.

In some embodiments, prediction module 106 can be a machine learning model (e.g., neural network, support vector machine ("SVM"), random forests, gradient boosting, etc.) that is trained by training data 108. For example, training data 108 can include labeled data, such as metadata profiles generated by processing labeled and/or structured data. However, as disclosed below, in embodiments, the training data is synthetic training data, which obviates the need for labeled data. In some embodiments, the output from processing module 104, such as the processed input data (e.g., metadata profiles), or candidate pairs of invoices, as disclosed below, can be fed as input to prediction module 106. Prediction model 106 can generate output data 110, such as a listing of predicted duplicate invoices, in response to input data 102.

Figure 2:
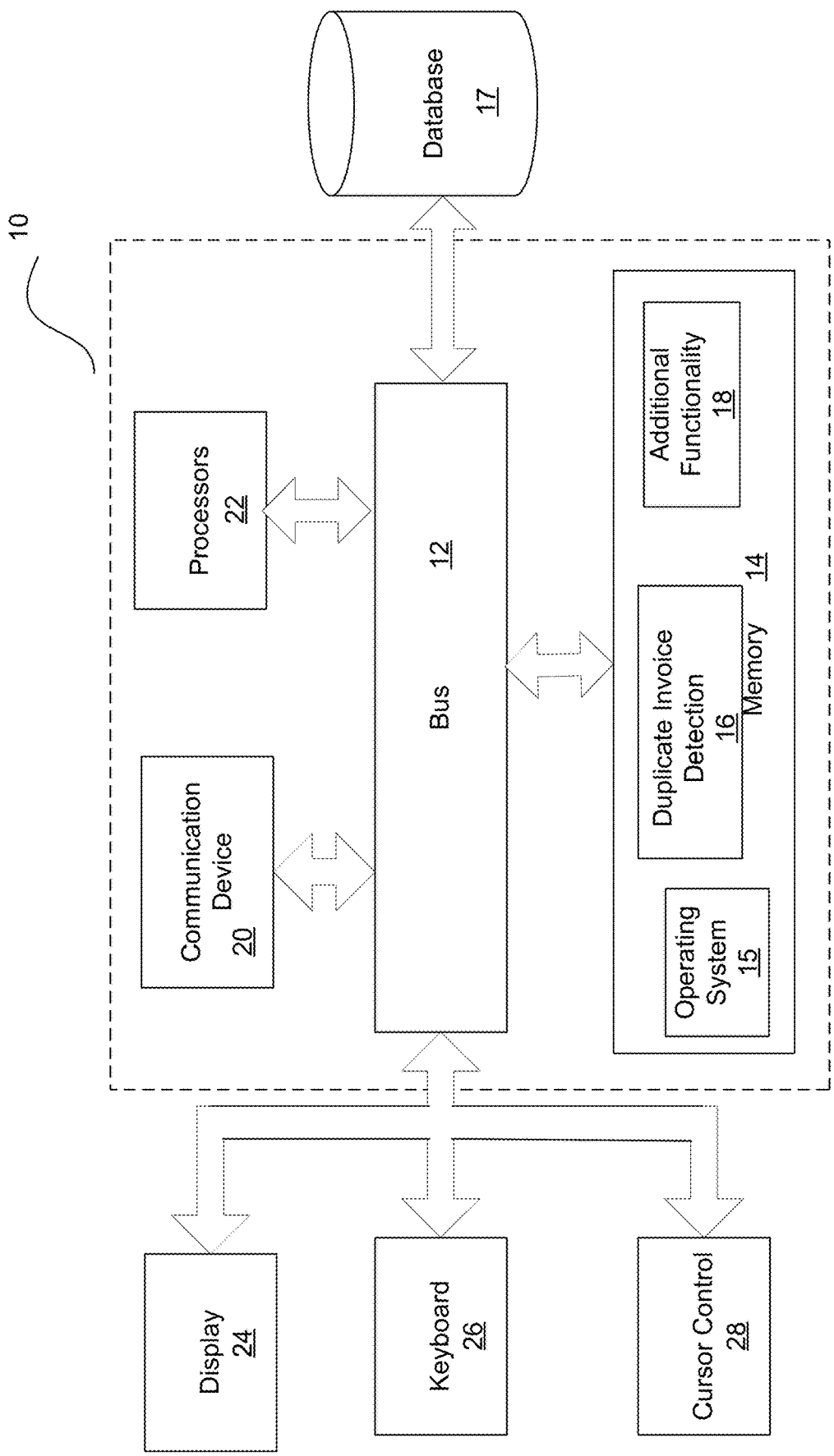
FIG. 2 is a block diagram of a computer server/system in accordance with an embodiment of the present invention.

FIG. 2 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. System 10 can centrally provide the functionality for all or some of the components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a duplicate invoice detection module 16 that provides ML based duplicate invoice detection, and all other functionality disclosed herein. System 10 can be part of a larger system. Therefore, system 10 can include one or more additional functional modules 18 to include the additional functionality, such as "Fusion Procurement" from Oracle Corp. or an enterprise resource planning ("ERP") system that includes an accounts payable function. A database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data.

In one embodiment, system 10 is a computing/data processing system including an application or collection of distributed applications for enterprise organizations, and may also implement logistics, manufacturing, and inventory management functionality. The applications and computing system 10 may be configured to operate locally or be implemented as a cloud-based networking system, for example in an infrastructure-as-a-service ("IAAS"), platform-as-a-service ("PAAS"), or software-as-a-service ("SAAS") architecture.

As disclosed, a duplicate invoice may be entered into an Accounts Payable system for multiple reasons. The same invoices may be sent more than once by a vendor for processing due to a delayed payment to the vendor. The same invoices may be sent through multiple channels by vendors (e.g., email, online portals, etc.). There may be OCR errors, such as an 'O' replaced by a '0' or '1' replaced by a pipe (|). Unintentional typographical errors may be made in the course of entering hundreds of invoices per day. Further, fraudulent activities by a vendor may occur such as trying to claim reimbursements multiple times by sending the same invoice multiple times and hoping the payee does not detect the duplicate invoices.

Duplicate invoices are generally difficult to handle by enterprise Accounts Payable teams because of the potentially substantial manual requirements. The risk that an Accounts Payable team can end up paying an invoice multiple times to its supplier. De-duplicating invoices is very difficult to do manually because a variety of field types make up an invoice (e.g., dates, numbers, currency, text fields, etc.). Due to large volumes, it is infeasible to manually check every invoice as to whether it has already been paid. Most companies resort to checking for duplicate invoice identifiers ("IDs") or use simple rules to identify duplicates.

FIG. 3 illustrates an example of invoices that may be identified as possible duplicates. Invoices identified by Index 1 and 3 (column 301) have similar invoice numbers (column 302), the same supplier (column 303), similar invoice descriptions (column 304), a different invoice date (column 305), and the same amount (column 306). It would be beneficial for an automated system to detect these pair of invoices, out of thousands or millions of invoices, and provide a prediction of the likelihood that the pair are indeed duplicates.

Therefore, there is a need for an improved duplicate invoice detection system to avoid large financial losses occurring due to duplicate payments as well as to avoid the cost and manual effort required to review the invoices to find duplicates Automated duplicate detection solutions are difficult to implement because of the unavailability of data of all different types of possible duplicates. Further, it is generally infeasible to compare each invoice with every other invoice available in a database, assuming a large organization, so there is a need to reduce the search space.

In contrast to known solutions, embodiments train a machine learning model on a synthetic training dataset and use this model to make predictions (duplicate/non-duplicate) on "unseen" data (i.e., new incoming data or data which the ML model has not seen during the training phase).

Figure 4:
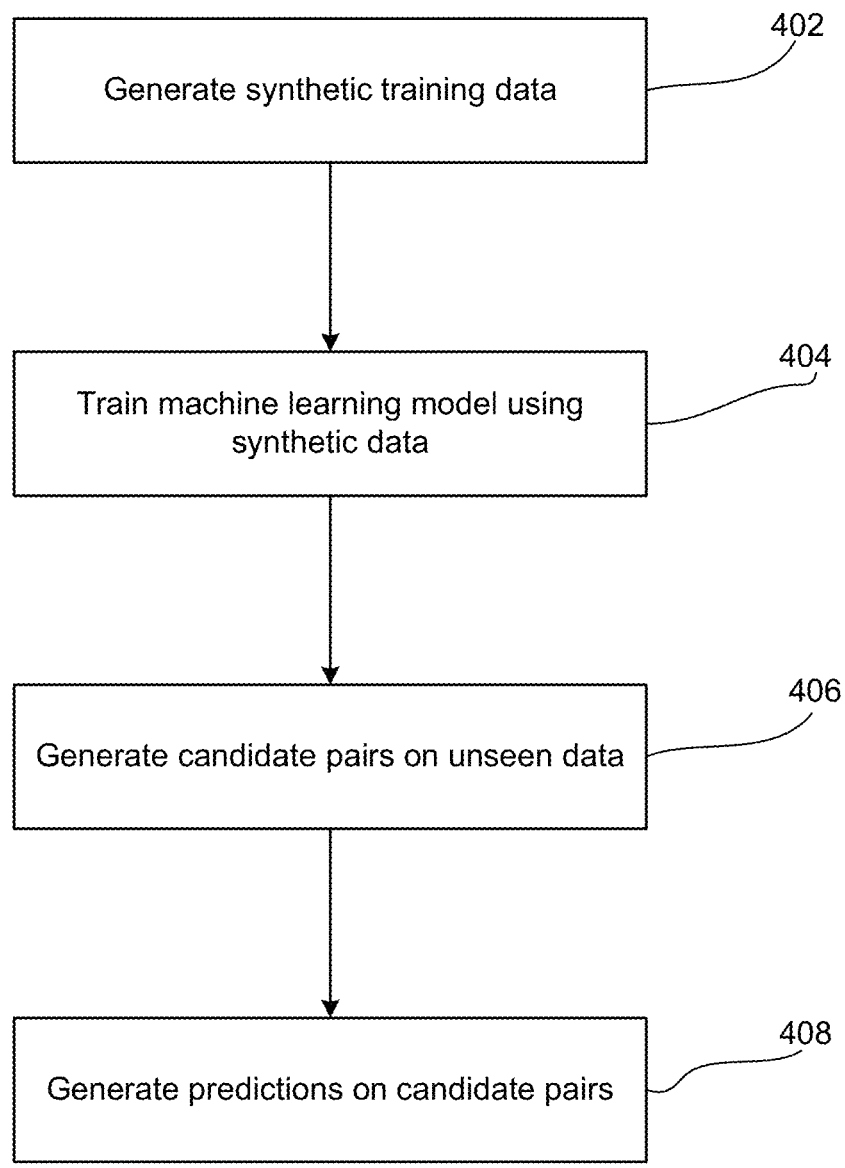
FIG. 4 is a flow diagram of the functionality of the duplicate invoice detection module of FIG. 2 for performing duplicate invoice detection in accordance with one embodiment.

FIG. 4 is a flow diagram of the functionality of duplicate invoice detection module 16 of FIG. 2 for performing duplicate invoice detection in accordance with one embodiment. In one embodiment, the functionality of the flow diagram of FIG. 4 (and FIG. 5 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Embodiments utilize invoices having one or more of the fields/columns shown in Table 1 below. In other embodiments, a different combination of fields can be used. In embodiments, the fields can be stored in a database as a specialized data structure as a database table.

TABLE 1

| | Field/column name | Description |
|---|---|---|
| 1 | Invoice_ID | Invoice ID |
| 2 | Invoiced_On_Date | Date on which invoice is created |
| 3 | Invoice_Schedule_Due_Date | Invoice due date |
| 4 | Invoice_Amount | Invoice amount |
| 5 | Vendor_ID | Vendor ID |
| 6 | Vendor_Account_Number | Vendor account number |
| 7 | Invoice_Description | Text description on invoice |
| 8 | Invoice_Created_By_UserID | User who has created the invoice |

At 402, synthetic training data is generated. In order to train an accurate machine learning system, embodiments need to include as many as possible types of duplicates as part of the training data. However, many organizations do not this data readily available. Therefore, embodiments create a synthetic training dataset covering all, or practically all, different possible types of invoice duplicates.

Embodiments begin with an initial dataset of "k" original invoices, where k in embodiments includes approximately 500-2000 invoices, depending upon availability of data. The initial dataset should not include any duplicate invoices. In embodiments, the training invoices of the initial dataset are selected which have as much as possible different values for each field, and manual or automated processes can be used to determine that there are no duplicates in the initial dataset. Embodiments select each invoice from the initial dataset and create a duplicate by modifying random number of columns/fields of Table 1 on each invoice. As a result, the synthetic training dataset includes k "duplicate" pairs (i.e., two invoices that are considered duplicate but have some intentionally created differences in one or more fields).

In embodiments of Table 1, there are 8 fields/columns for each invoice. A duplicate invoice can have any number of fields modified, from 1 to 8. However, according to the problem definition, most duplicate invoices will have very few unmatching fields since duplicates typically arise from sources such as OCR errors, typing errors, the same invoice sent multiple times, etc. Further, detecting invoices which have very high number of fields modified fraudulently is generally considered a different problem from the duplicate invoice problem, and can be referred to as a "fraud" detection problem. A fraud detection problem can be caused by vendors trying to claim a payment multiple times by modifying the invoice details fraudulently, whereas duplicate invoices arise due to "innocent" mistakes such as disclosed above, which generally result in at least one field of a duplicate invoice that exactly matches with the field of the original invoice. Embodiments disclosed herein generally solve the duplicate invoice problem but are not designed to solve a fraud detection problem.

With duplicate invoices, the probability of having a lesser number of unmatching fields in a duplicate invoice is higher than the probability of having a higher number of unmatching fields in a duplicate invoice. Therefore, with embodiments, while generating synthetic training data, the distribution of the number of modified fields among the duplicate pairs generated is such that the percentage of pairs with lesser unmatching columns should be higher than percentage of pairs with higher unmatching fields. An example distribution of the number of modified fields in embodiments is shown in Table 2:

TABLE 2

| Number of fields modified of an invoice to create its duplicate | % of duplicate pairs (out of k) |
| --- | --- |
| 1 | 30% |
| 2 | 22% |
| 3 | 18% |
| 4 | 10% |
| 5 | 8% |
| 6 | 6% |
| 7 | 3% |
| 8 | 2% |

The above distribution ensures that the synthetic training data will have higher duplicate pairs with a lesser number of unmatching fields, and lesser duplicate pairs with a higher number of unmatching fields. The percentage numbers in Table 2 can differ in other embodiments.

Embodiments modify different fields using different operations, depending on their datatypes. Table 3 below provides details on how each field of Table 1 is modified in accordance to embodiments:

TABLE 3

| Field Name | Method to modify |
| --- | --- |
| 1. Invoice_ID | Edit distance operation (randomly choose to insert/delete/replace character at random index) |
| 2. Invoiced_On_Date | Randomly add days or months or years to existing date |
| 3. Invoice_Schedule_Due_Date | Randomly add days or months or years to existing date |
| 4. Invoice_Amount | 1. Round off<br>2. Consider up to 2 digits after decimal<br>3. Add random integer {1, −1}<br>4. Edit distance operation after decimal point |
| 5. Vendor_ID | Edit distance operation (randomly choose to insert/delete/replace character at random index) |
| 6. Vendor_Account_Number | Edit distance operation (randomly choose to insert/delete/replace character at random index) |
| 7. Invoice_Description | 1. Edit distance operation (randomly choose to insert/delete/replace character at random index)<br>2. Adding word synonyms using off the self nlp wordnet library or using embedding |
| 8. Invoice_Created_By_UserID | Edit distance operation (randomly choose to insert/delete/replace character at random index) |

The functionality of 402 generates k duplicate pairs. Next, embodiments generate non-duplicate pairs using the initial dataset with k original invoices by pairing each original invoice with other non-duplicate (k−1) original invoices. The synthetic labeled training data is formed by combining the generated duplicate and non-duplicate pairs, with each pair labeled either duplicate or non-duplicate.

While choosing the initial data of original invoices, embodiments include invoices from multiple organizations. Including a variety of invoices in training data will help to create a more robust machine learning model for duplicate detection.

Table 4 below provide examples of duplicate invoices generated using 402 of FIG. 4. Rows with the same number in the far right column are considered a pair of duplicate invoices, where one or more fields differ.

TABLE 4

| Invoice_ID | Invoiced_On_Date | Invoice_Schedule_Due_Date | Invoice_Amount | Vendor_ID | Vendor_Account_Number | Invoice_Description | Invoice_Created_By_UserID | n_fields_modified |
| --- | --- | --- | --- | --- | --- | --- | --- | --- |
| 32L3z73xh | 2002 Aug. 4 | 2002 Sep. 18 | 4689.9702 | 12444 | 2332 | Misc. | 2046 | 1 |
| 32373 | 2002 Aug. 4 | 2002 Sep. 18 | 4689.9702 | 12444 | 2332 | Misc. | 2046 | 1 |
| 202587 | 2014 Jan. 6 | 2014 Jan. 6 | 1500 | g0010Df32575IU8 | 03JL2575Hm7b07 | Misc. | OPERATIONS | 2 |
| 202587 | 2014 Jan. 6 | 2014 Jan. 6 | 1500 | 300100032575688 | 032575707 | Misc. | OPERATIONS | 2 |
| 9w112V0 | 2013 Sep. 16 | 2013 Dec. 9 | 78259.978 | 300100027268054 | 300100027268072 | Misc. | CVBUYER01 | 3 |
| 191200 | 2013 Sep. 10 | 2013 Dec. 9 | 78257.77922 | 300100027268054 | 300100027268072 | Misc. | CVBUYER01 | 3 |

TABLE 4-continued

| Invoice_ID | Invoiced_On_Date | Invoice_Schedule_Due_Date | Invoice_Amount | Vendor_ID | Vendor_Account_Number | Invoice_Description | Invoice_Created_By_UserID | n_fields_modified |
|---|---|---|---|---|---|---|---|---|
| 248112 | 2008 Nov. 19 | 2006 Dec. 20 | 3295.02 | 100000011592689 | 100000011592736c | Misc. | PV_ITALY | 4 |
| 248112 | 2006 Nov. 20 | 2006 Nov. 20 | 3295.019157 | 100000011592689 | 100000011592736 | Misc. | PV_ITALY | 4 |
| 183N44 | 2013 Aug. 21 | 2013 Aug. 20 | 100.8 | 6595597 | 11775 | abcdefg | 0g | 5 |
| 183744 | 2013 Aug. 20 | 2013 Aug. 20 | 100 | 6595597 | 11775 | ABCD | 0 | 5 |
| 1642656 | 2010 Oct. 13 | 2012 Apr. 25 | 131.27 | 5V64 | d99999 | Test9.4 | OPERATIONS | 6 |
| 164265 | 2009 Oct. 13 | 2012 Apr. 25 | 131.27 | 5264 | −99999 | Test9.5 | OPERATION | 6 |
| 514117 | 2009 Dec. 16 | 2009 Dec. 13 | 100 | 659U5597 | 1775 | XYZ | OPERATIONS | 7 |
| 5141173 | 2009 Dec. 14 | 2009 Dec. 14 | 101 | 6595597 | 11775 | WXyZ | OPERATIONS | 7 |
| 372249e | 2018 Oct. 19 | 2020 Nov. 17 | 1138 | 30010003257578 | 300100M36117600 | abcd | AP_SUPV_Pp | 8 |
| 372249 | 2018 Nov. 18 | 2018 Nov. 18 | 1138.20032 | 300100032575708 | 300100136117600 | ABCD | AP_SUPV_PD | 8 |

At 404, the machine learning model is trained using the synthetic dataset of 402 of pairs of invoices, some labeled duplicate and some labeled non-duplicate. Embodiments have a target variable of "Is_Duplicate" (1 indicates Duplicate and 0 indicates non-Duplicate). For training the machine learning model, embodiments create features based on edit distance, numerical difference between fields, number of matching and unmatching fields, Boolean flags on field equality, probability of being duplicates based on number of equal fields, etc. In embodiments the machine learning model is a Gradient Boosting model/classifier that is trained on the synthetic data where the target variable is the Is_Duplicate flag and the input features as listed below. Embodiments then use this trained model to make predictions on unseen data.

Gradient boosting is a machine learning technique used in regression and classification tasks, among others. It gives a prediction model in the form of an ensemble of weak prediction models, which are typically decision trees. When a decision tree is the weak learner, the resulting algorithm is called gradient-boosted trees and typically outperforms random forest. A gradient-boosted trees model is built in a stage-wise fashion as in other boosting methods, but it generalizes the other methods by allowing optimization of an arbitrary differentiable loss function.

Table 5 below lists the features used in the Gradient Boosting model in accordance to embodiments.

TABLE 5

| | Name of Feature | Description |
|---|---|---|
| 1 | invoice_id_edit_distance | Edit distance between invoice ids of two invoices in the pair |
| 2 | vendor_id_edit_distance | Edit distance between vendor ids of two invoices in the pair |
| 3 | vendor_account_id_edit_distance | Edit distance between vendor account numbers of two invoices in the pair |
| 4 | invoice_amount_diff | Absolute difference between invoice amounts of invoices in the pair |
| 5 | user_id_edit_distance | Edit distance between two user ids in the pair |
| 6 | on_date_diff_days | Number of days between two invoice creation dates |
| 7 | due_date_diff_days | Number of days between two invoice due dates |
| 8 | description_similarity | Edit distance between invoice descriptions of two invoices in the pair |
| 9 | same_invoice_id | Flag on invoice id equality |
| 10 | same_vendor_id | Flag on vendor id equality |
| 11 | same_vendor_account_number | Flag on vendor account number equality |
| 12 | same_invoice_amount | Flag on invoice amount equality |
| 13 | same_user_id | Flag on user id equality |
| 14 | same_on_date | Flag on invoice creation dates equality |
| 15 | same_due_date | Flag on invoice due dates equality |
| 16 | same_description | Flag on invoice description equality |
| 17 | n_equal_columns | Total number of fields with equal values in both invoices in the pair |
| 18 | n_unequal_columns | Total number of fields with unequal values in both invoices in the pair |

Figure 5:
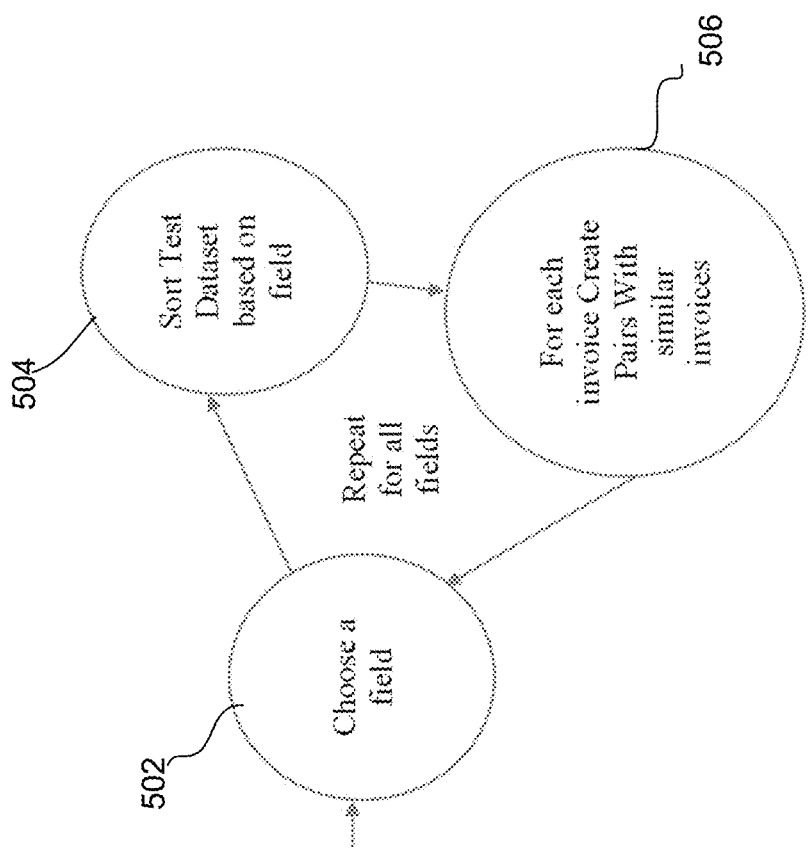
FIG. 5 is a flow diagram to generate an exhaustive list of pairs of invoices which could be duplicates of each other in accordance to embodiments.

At 406, embodiments generate candidate pairs of invoices which are suspected duplicates in unseen data, or a "test" set or "live" dataset. To detect duplicate invoices among an unseen data set of n invoices, embodiments first need to create pairs. A brute force approach is to create N(N−1)/2 unique pairs, and check if invoices forming each pair are duplicates of each other or not. However, this solution is infeasible computationally for a large number of invoices (e.g., over 1 million). Therefore, instead, embodiments use the functionality of FIG. 5 to generate an exhaustive list of pairs of invoices which could be duplicates of each other. The functionality of FIG. 5 is a "Blocking" strategy to reduce dimensionality. Each duplicate pair of invoices will have some fields in common, and invoices are grouped by common fields.

At 502, one of the fields is chosen. For example, initially the invoice ID field is chosen. At 504, the live dataset is sorted based in the chosen field. Sorting based on invoice IDs (or other chosen field) will ensure that invoices with equal or similar invoice IDs are ordered close to each other. Sorting has the potential to bring strings with little difference close to each other.

Now for an invoice with row ID $i \in [0, n-1]$ in the sorted live dataset, at 506 embodiments compare its invoice ID with the invoice ID of the invoice at row id j=i+1, i+2, i+3, . . . and so on, where n is the total number of invoices in the live dataset. Embodiments keep forming the pairs for the invoice at row i with the invoice at row j until the invoice IDs of row i and row j have edit distance less than a predefined threshold.

Once the edit distance between the invoice IDs of row i and row j is more than the predefined threshold, embodiments stop forming pairs for row i and start forming pairs for the next invoice at row ID i+1. The threshold in embodiments may be a number of rows, a similarity measure, or a combination of both.

Once the iteration is complete, this process is repeated by sorting on other fields/columns one by one until the sorting is performed on all fields (e.g., 8 fields in embodiments disclosed above). As embodiments are generating pairs by sorting on all columns one by one, some duplicate pairs can be generated. The duplicate pairs will be dropped.

The total number of pairs generated using the functionality of FIG. 5 is O(n) (i.e., using the "Big O" notation). The overall time complexity is O(n log n) as there is a need to sort the dataframe.

Even if two invoices have only a single field with matching values, embodiments ensure that a pair will be formed with them and passed to the classifier for a prediction. This also means that potential duplicate candidate pairs are not being missed.

The following pseudocode implements the functionality of FIG. 5 to generate candidate pairs:

```
list_of_fields = list with 8 fields of invoices as per table 1
for field_name in list_of_fields
{
    df = df.sort(columns = [' field_name']) # sort the
    data-frame based on field_name
    for (i = 0, i<= n-1, i++)
    {
        for (j = i+1, j<= n-1, j++)
        {
            row_i_field = df['field_name'][i]
            row_j_field = df['field_name'][j]
            if( edit_distance(row_i_field, row_j_field) < threshold)
            {
                create_pair(row[i],row[j])
            }
            else
            {
                break
            }
        }
    }
}
```

In one embodiment, in addition to generating the candidate pairs at 406, m invoices are randomly selected. For each of these randomly selected m invoices, embodiments create candidate pairs by forming a pair with another randomly selected n invoice, where m and n are constant numbers. This random sampling can form candidate pairs which may have been missed at 406.

At 408, the candidate pairs generated on the test dataset at 406 are passed through the model trained on the synthetic data (i.e., input to the trained model), and the resulting output will be the predictions duplicate/non-duplicate with a probability score of being duplicate. FIG. 6 is an example output showing, for each pair of invoices, the duplicate probability as well as a risk in accordance to embodiments. In one embodiment, Risk=(probability of being duplicates)× (max(Invoice Amount of Invoice 1, Invoice Amount of Invoice 2)).

In one embodiment, the predictions are manually reviewed to determine if the predictions are accurate. The result of the review is labelled data that can be added to the synthetic training data and used to retrain the model at 404.

As disclosed, embodiments generate synthetic data to train a machine learning model for detecting invoices. Embodiments then generate candidate pairs of invoices that are input the trained model in order to predict if each pair is a duplicate. The candidate pairs is a subset of all potential pairs so that the automated detection is feasible even with a large number of candidate invoices.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of detecting duplicate invoices, each invoice comprising a plurality of fields, the method comprising:
   generating synthetic training data using a plurality of training invoices and generating one or more modified fields for each of the plurality of training invoices;
   training a machine learning model using the synthetic training data;
   generating a plurality of candidate invoice pairs comprising:
      receiving a plurality of live invoices, each live invoice comprising a plurality of sortable fields comprising text strings;
      selecting a next sortable field and sorting each of the live invoices based on the selected next sortable field to form ID rows of sorted invoices;
      forming candidate invoice pairs from consecutive row of the ID rows of sorted invoices by moving to a next ID row until an edit distance of the corresponding sortable field between a first ID row of the sorted invoices and a next ID row of the sorted invoices is greater than a predefined threshold; and
      repeating the selecting the next sortable field and forming candidate invoice pairs for each of the plurality of sortable fields;
   inputting the plurality of candidate invoice pairs to the trained machine learning model; and
   generating, by the trained machine learning model, a prediction of whether each of the candidate invoices pairs is a duplicate invoice pair.

2. The method of claim 1, the generating synthetic training data comprising:
   receiving a plurality of training invoices; and
   for each training invoice, modifying a random number of fields to create a synthetic duplicate pair of invoices.

3. The method of claim 1, the synthetic training data comprising a plurality of pairs of non-duplicate pairs comprising pairing each of k training invoices with a k−1 invoice.

4. The method of claim 1, wherein the predefined threshold comprises a number of rows or a similarity measure.

5. The method of claim 1, the prediction comprising a duplicate probability and a risk.

6. The method of claim 1, wherein the machine learning model comprises a gradient boosting model.

7. The method of claim 1, further comprising:
determining an accuracy of the prediction; and
retraining the machine learning model based on the accuracy.

8. The method of claim 4, the generating the plurality of candidate invoice pairs further comprising forming a plurality of randomly selected pairs.

9. A non-transitory computer readable medium having instructions stored thereon that, when executed by one or more processors, cause the processors to detect duplicate invoices, each invoice comprising a plurality of fields, the detecting comprising:
generating synthetic training data using a plurality of training invoices and generating one or more modified fields for each of the plurality of training invoices;
training a machine learning model using the synthetic training data;
generating a plurality of candidate invoice pairs comprising:
receiving a plurality of live invoices, each live invoice comprising a plurality of sortable fields comprising text strings;
selecting a next sortable field and sorting each of the live invoices based on the selected next sortable field to form ID rows of sorted invoices;
forming candidate invoice pairs from consecutive row of the ID rows of sorted invoices by moving to a next ID row until an edit distance of the corresponding sortable field between a first ID row of the sorted invoices and a next ID row of the sorted invoices is greater than a predefined threshold; and
repeating the selecting the next sortable field and forming candidate invoice pairs for each of the plurality of sortable fields;
inputting the plurality of candidate invoice pairs to the trained machine learning model; and
generating, by the trained machine learning model, a prediction of whether each of the candidate invoices pairs is a duplicate invoice pair.

10. The computer readable medium of claim 9, the generating synthetic training data comprising:
receiving a plurality of training invoices; and
for each training invoice, modifying a random number of fields to create a synthetic duplicate pair of invoices.

11. The computer readable medium of claim 9, the synthetic training data comprising a plurality of pairs of non-duplicate pairs comprising pairing each of k training invoices with a k−1 invoice.

12. The computer readable medium of claim 9, wherein the predefined threshold comprises a number of rows or a similarity measure.

13. The computer readable medium of claim 9, the prediction comprising a duplicate probability and a risk.

14. The computer readable medium of claim 9, wherein the machine learning model comprises a gradient boosting model.

15. The computer readable medium of claim 9, the detecting further comprising:
determining an accuracy of the prediction; and
retraining the machine learning model based on the accuracy.

16. The computer readable medium of claim 12, the generating the plurality of candidate invoice pairs further comprising forming a plurality of randomly selected pairs.

17. A duplicate invoice detection system comprising:
a database storing a plurality of training invoices; and
one or more processors coupled to the database and configured to detect duplicate invoices, each invoice comprising a plurality of fields, detecting comprising:
generating synthetic training data using a plurality of training invoices and generating one or more modified fields for each of the plurality of training invoices;
training a machine learning model using the synthetic training data;
generating a plurality of candidate invoice pairs comprising:
receiving a plurality of live invoices, each live invoice comprising a plurality of sortable fields comprising text strings;
selecting a next sortable field and sorting each of the live invoices based on the selected next sortable field to form ID rows of sorted invoices;
forming candidate invoice pairs from consecutive row of the ID rows of sorted invoices by moving to a next ID row until an edit distance of the corresponding sortable field between a first ID row of the sorted invoices and a next ID row of the sorted invoices is greater than a predefined threshold; and
repeating the selecting the next sortable field and forming candidate invoice pairs for each of the plurality of sortable fields;
inputting the plurality of candidate invoice pairs to the trained machine learning model; and
generating, by the trained machine learning model, a prediction of whether each of the candidate invoices pairs is a duplicate invoice pair.

18. The system of claim 17, the generating synthetic training data comprising:
receiving a plurality of training invoices; and
for each training invoice, modifying a random number of fields to create a synthetic duplicate pair of invoices.

19. The system of claim 17, the synthetic training data comprising a plurality of pairs of non-duplicate pairs comprising pairing each of k training invoices with a k−1 invoice.

20. The system of claim 17, wherein the predefined threshold comprises a number of rows or a similarity measure.

* * * * *